(No Model.)

W. D. EWART.
Drive Chain.

No. 239,749. Patented April 5, 1881.

Attest;
Geo. H. Graham
Jacob Felbel

Inventor,
W. D. Ewart
By J. Mc Intire
Att'y.

UNITED STATES PATENT OFFICE.

WILLIAM D. EWART, OF CHICAGO, ILLINOIS.

DRIVE-CHAIN.

SPECIFICATION forming part of Letters Patent No. 239,749, dated April 5, 1881.

Application filed January 20, 1881. (No model.)

*To all whom it may concern:*

Be it known that I, WILLIAM DANA EWART, of Chicago, in the county of Cook and State of Illinois, have invented certain new and useful Improvements in Drive-Chains; and I do hereby declare that the following is a full and exact description of the invention, reference being had to the accompanying drawings, making part of this application.
My invention relates to a new and useful improvement in that class of drive-chains which has the usually detachable parts or links composed of wire.

Previous to my invention chains of this class have been made of various forms and constructions; but in all of them, so far as my knowledge goes, the principle of construction has been such that the capacity to withstand the draft-strain and the frictional wear to which the parts must be subjected at the joints or points of articulation has been small compared with that of drive-chains having the parts made of cast metal, because in the construction of such wire chains it has been customary to have the hook-like or eye-like coupling devices of the link composed wholly of the wire.

I propose to increase the strength and wearing capacity (or endurance) of this class of chains, and thus cure a comparative defect in it, by providing means which shall render the working surfaces or bearings of the coupler devices at the points of articulation of the links as strong and durable as these of the most desirable cast-metal (link) chains; and to this main end and object my invention consists, essentially, in a chain-link composed of coupler-wire, the hook-like coupler devices of which have combined with them a sort of bushing device, which constitutes a hollow end bar for the accommodation of and within which can freely turn the plain wire end bar of a similar link, the coupled parts being, by preference, adapted to be uncoupled, but only when turned into a given relative position, all as will be hereinafter more fully explained.

To enable those skilled in the art to make and use my invention, I will now proceed to more fully describe the construction and operation of my improved wire drive-chain link, referring by letters to the accompanying drawings, forming part of this specification, and in which—

Figure 1:
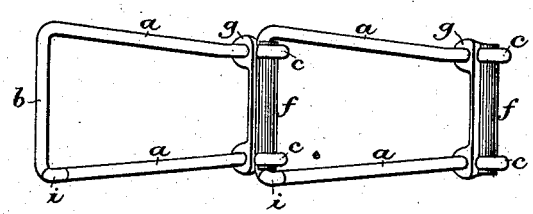
Figure 2:
Figure 3:
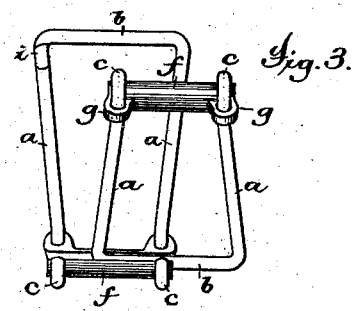
Figure 4:
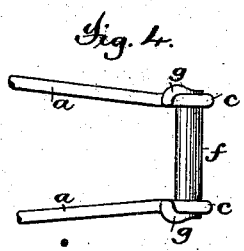

Figure 1 is a plan or face view of the chain embodying my invention. Fig. 2 is an edge view of the same. Fig. 3 is a top view, showing one of the links turned into the position for uncoupling and partially uncoupled from its mate; and Fig. 4 is a partial back view, showing a modification in the form of the cast-metal bushing device.

In the several figures the same part will be found designated by the same letter of reference.

My improved chain-link is composed, preferably, of a single piece of wire bent round to form three sides of its contour, or, in other words, to form the two side bars, *a a*, and one end bar, *b*, the general contour of the link being, by preference, nearly rectangular, as shown. Each end of the piece of wire (and consequently one end of each side bar, *a*) is bent to form an open hook-like device, *c*. This device *c* is almost a circular eye, its contour being broken only at *d*, where is an opening or throat a little less in width than the diameter of the wire of which the link is composed.

*f* is a cast-metal bushing device, which, as seen, is nearly a cylindrical tube in form, being open along its entire length at the point *e*, and having integral with it hook-like devices or eyes at *g*, which (either partially or wholly) encircle or embrace the wire composing the hooks *c c* at their roots—*i. e.*, near the point where the said hooks run into the straight portions of the wire composing what I have called the "side bars." The slot-like opening at *e* in the nearly tubular casting *f* is of a width about equal to that of the opening at *d* in the hook-like device *c*, and consequently of a width somewhat less than the diameter of the wire of which the link is composed. The device *f*, the external diameter of which, at each end, is about sufficient to snugly fill the interior diameter of one of the hooks *c*, is just about long enough to extend from one to the other of said hooks *c* and through each of them, as plainly shown, and thus form a continuous hollow end bar (as it were) to the link; and the interior diameter or bore of the bushing device *f* is just about large enough to snugly embrace and permit to turn within it (hinge fashion) the plain wire end bar of the adjoining link of a chain. At the point *i* the wire of the link has a depression (in one or both sides of the wire) or flattened place, where the thickness of the wire in one direction is thus reduced to an extent sufficient to allow the wire at this point to pass through the openings at $d$ of the hooks $c$, and, of course, also through the slot-like opening $e$ of the bushing device $f$. This depression can, however, be brought into the relative position to permit its passage through the openings referred to only when two adjacent and coupled links shall be turned out of their working position and into the positions seen at Fig. 3 of the drawings.

So far as the mode of operation to couple and uncouple the links of a chain made as described is concerned, the improved link is quite analogous to and embraces the same principle of operation as what is well known in the market as the "Ewart" detachable drive-chain.

In a chain made according to the herein-described invention the coupled links will work together much after the fashion of the Ewart cast link chains, the parts composing the improved chain being perfectly articulate— that is, being connected or coupled together by a perfectly hinge-like joint, and yet capable of separation by turning any two links into the position seen at Fig. 3, and moving them sidewise, relatively, so that the plain end bar, $b$, of one will slide endwise within the tubular end bar, $f$, of the other; but the main advantages of the construction of a wire link with an end bar of nearly or quite tubular form may, it will be understood, be embodied in a chain-link not adapted to form a detachable chain.

In lieu of having the embracing devices $g$ of the hollow end bar, $f$, made hook-like, (as seen at Fig. 3,) they may be made in the form of eyes perfectly surrounding the wire of the link, as shown in the modification of my novel link illustrated at Fig. 4.

The slot-like opening in the device $f$ might be wider than those in the hooks $c$; but I prefer the form shown, and other changes of form and proportion in some or all of the parts may of course be made without departing from the gist of the main part of my invention, which I understand to be in the use, in connection with the wire hook-like portions of the link, of some such tubular end bar or bushing device as $f$, adapted to afford a continuous bearing (lengthwise) to the plain end bar, $b$, to be held and to turn pintle-like within said device $f$.

What I therefore claim as of my invention, and desire to secure by Letters Patent, is—

1. A wire chain-link having one end bar composed of a bushing-like or tubular device, $f$, properly retained within the hook-like portions $c\ c$ of the link, and adapted to afford a bearing to the plain end bar, $b$, of a link, substantially as and for the purpose set forth.

2. A wire chain-link having a nearly tubular bushing device, $f$, combined with the hook-like portions $c\ c$ of the wire, and having the end of the link opposite to that at which said bushing device is located adapted to be coupled with and uncoupled from said nearly tubular device, all substantially in the manner set forth.

In testimony whereof I have set my hand this 1st day of December, 1880.

WILLIAM DANA EWART.

In presence of—
EDWARD F. GORTON,
JAMES M. DODGE.